(12) United States Patent
Ong et al.

(10) Patent No.: US 9,129,649 B2
(45) Date of Patent: Sep. 8, 2015

(54) DATA STORAGE DEVICE AND A METHOD FOR PROVIDING A SYNCHRONIZATION SIGNAL FOR AT LEAST ONE OF A READ OPERATION OR A WRITE OPERATION CARRIED OUT BY MEANS OF A HEAD IN A DATA STORAGE DEVICE

(71) Applicant: MARVELL INTERNATIONAL LTD., Hamilton (BM)

(72) Inventors: Chun Lian Ong, Singapore (SG); Zhimin Yuan, Singapore (SG); Jingliang Zhang, Singapore (SG); Bo Liu, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 13/684,116

(22) Filed: Nov. 21, 2012

(65) Prior Publication Data

US 2013/0148236 A1 Jun. 13, 2013

(30) Foreign Application Priority Data

Nov. 21, 2011 (SG) ................................ 201108619-6

(51) Int. Cl.
*G11B 20/10* (2006.01)

(52) U.S. Cl.
CPC .... *G11B 20/10222* (2013.01); *G11B 20/10259* (2013.01)

(58) Field of Classification Search
None
See application file for complete search history.

(56) References Cited

U.S. PATENT DOCUMENTS

| 4,864,428 A | * | 9/1989 | Kanamaru | ................. 386/206 |
| 2005/0007690 A1 | * | 1/2005 | Wong et al. | ............. 360/77.06 |

* cited by examiner

*Primary Examiner* — Daniell L Negron (57) ABSTRACT

According to embodiments of the present invention, a method for providing a synchronization signal for at least one of a read operation or a write operation carried out by means of a head in a data storage device is provided. The method includes obtaining a readback servo signal from a storage medium of the data storage device by means of the head, the readback servo signal having at least one frequency associated with a servo track of the storage medium, frequency mixing the readback servo signal with a local signal having a local frequency to provide a frequency mixed signal, and filtering the frequency mixed signal to provide the synchronization signal for at least one of the read operation or the write operation. According to further embodiments of the present invention, a data storage device is also provided.

15 Claims, 8 Drawing Sheets

DATA STORAGE DEVICE AND A METHOD FOR PROVIDING A SYNCHRONIZATION SIGNAL FOR AT LEAST ONE OF A READ OPERATION OR A WRITE OPERATION CARRIED OUT BY MEANS OF A HEAD IN A DATA STORAGE DEVICE

CROSS-REFERENCE TO RELATED APPLICATION

This application claims the benefit of priority of Singapore patent application No. 201108619-6, filed 21 Nov. 2011, the content of it being hereby incorporated by reference in its entirety for all purposes.

TECHNICAL FIELD

Various embodiments relate to a data storage device and a method for providing a synchronization signal for at least one of a read operation or a write operation carried out by means of a head in a data storage device.

BACKGROUND

Electronic devices, including mobile computing and/or communication devices, are becoming smaller thereby driving the weight and size of data storage devices down, while requiring large storage capacity in the terabyte range and low power consumption. To increase storage capacity, it would require the need for increased precision in tracking the movement of the read/write head as well as the use of recording technology such as Two Dimensional Magnetic Recording (TDMR).

One of the major challenges in TDMR technology is the need for 2 dimensional channel codes for data recovery and error correction. To realize such technology, additional synchronization signal is needed during data writing and reading of 2 dimensional data. There is no synchronization signal in the conventional hard disk drive (HDD).

The conventional dedicated servo system where the servo information is provided on a layer distinct from the data recording layer, provides a possibility to generate a synchronization signal, apart from the purpose of providing a continuous servo control during read and write.

SUMMARY

According to an embodiment, a method for providing a synchronization signal for at least one of a read operation or a write operation carried out by means of a head in a data storage device is provided. The method may include obtaining a readback servo signal from a storage medium of the data storage device by means of the head, the readback servo signal having at least one frequency associated with a servo track of the storage medium, frequency mixing the readback servo signal with a local signal having a local frequency to provide a frequency mixed signal, and filtering the frequency mixed signal to provide the synchronization signal for at least one of the read operation or the write operation.

According to an embodiment, a data storage device is provided. The data storage device may include a head configured to obtain a readback servo signal from a storage medium of the data storage device, the readback servo signal having at least one frequency associated with a servo track of the storage medium, a frequency mixing circuit configured to mix the readback servo signal with a local signal having a local frequency to provide a frequency mixed signal, and a filter configured to filter the frequency mixed signal to provide a synchronization signal for at least one of a read operation or a write operation carried out by means of the head.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of a method are analogously valid for a device, and vice versa.

In the context of various embodiments, the articles "a", "an" and "the" as used with regard to a feature or element includes a reference to one or more of the features or elements.

In the context of various embodiments, the phrase "at least substantially" may include "exactly" and a reasonable variance.

As used herein, the term "and/or" includes any and all combinations of one or more of the associated listed items.

Various embodiments relate to synchronization signal generation by frequency mixer from a servo signal. For example, various embodiments may provide a data storage device including a frequency mixer for generating a synchronization signal from a servo signal, and a method employing frequency mixing for generating a synchronization signal from a servo signal.

In various embodiments, the synchronization signal may be used for synchronizing at least one of the read operation or the write operation carried out by the head (e.g. read/write head) in a data storage device, e.g. for the read operation, or the write operation, or both the read and write operations. For example, the synchronization signal may be configured as a clock signal for synchronization of the read and/or write operations.

In various embodiments, the synchronization signal may be provided for the read operation and the write operation in a data storage device (e.g. hard disk drive), for example in the application of Two Dimensional Magnetic Recording (TDMR) for writing two dimensional (2-D) channel code in sync for adjacent data tracks. The writing to the adjacent data tracks may be synchronised, while a read operation is also carried out by the head. In addition, the synchronisation signal may also be used for timing jitter recovery.

Two Dimensional Magnetic Recording (TDMR) is a technology which may achieve high areal densities by recording each bit of information on as few magnetic grains as possible in the recording medium and relying on two-dimensional signal processing to recover the information.

In TDMR, shingled writing may be employed to record small bits with overlap in the layout of data tracks. In shingled writing, the recording head moves in the downtrack direction along a particular track as the data is written in blocks or shingles, and successive scans move across the disk in a cross-track direction across adjacent tracks. The magnetic flux of a head is used when writing a shingle or shingles of data to the tracks of the disk. As shingles are written, writing on a current track may overwrite a portion of the previous track and the resultant is a narrower track pitch.

Two dimensional channel code may decode the data in 2 dimensions, based on multiple tracks (for example as a page) instead of single tracks at a time. This may improve the SFR (sector failure rate) by reducing inter-symbol interference (ISI) and/or inter track interference (ITI).

In a conventional hard disk drive (HDD), a pre-amble is written before the servo track from which the timing information may be obtained. When detecting the signal from HDD, the digitizer uses this timing information (clock signal) to detect the correct data. This process is termed "timing jitter recovery". In various embodiments, as the synchronization signal obtained by the approach of various embodiments provides timing information, the synchronisation signal may be used for timing jitter recovery.

In general, a head-positioning servomechanism is provided in a data storage device, e.g. a hard disk drive (HDD), which acts as a control system. The control system may position the head (e.g. read/write (R/W) head) which is mounted on an actuator over a desired data track of a storage medium and reposition the head from one data track to another.

In a HDD servo control system, the position error signal (PES), and therefore the position of the head relative to the center of the desired data track, may be sensed and used by the servo system to generate the appropriate commands to the actuator, which in turn moves the head in an effort to reduce the position error. PES is a signal proportional to the relative difference of the positions of the centre of the head and the nearest track centre. Therefore, the PES may provide an indication of the position of the head relative to the storage medium, for example the position of the head relative to a data track, and whether the head is positioned at the centre of the data track (on track) or shifted relative to the centre of the data track (off track) and the magnitude of the shift, such that the position of the head may then be adjusted.

In a dedicated servo implementation, one disk surface (servo layer) is dedicated to store the position data referred to as servo data or servo signal. The servo layer may be a buried layer arranged beneath the data recording layer. Further, the servo layer and the data recording layer may be put or arranged on the same side or same plane, and they may be read and/or processed together; this may also be referred to as dedicated servo. In the context of various embodiments, the servo layer and the data recording layer are separate layers or distinct layers where the signals from the servo layer and the data layer may be read together at the same time. The servo layer may have a perpendicular or a longitudinal magnetization orientation for providing magnetic information for determining the location of the head in relation to the storage medium. The servo information is provided on the servo layer distinct from the data recording layer so as to allow continuously available servo readback to enable continuous or continual position feedback thereby providing continuous or continual location detection without utilizing any of the recording layer for location detection. The dedicated servo may provide higher positioning accuracy through continuous or continual location determination, while also removing the servo sectors/tracks from the recording layer, thereby increasing surface utilization of the storage space in the recording layer and further increasing the data recording density by increasing the track positioning accuracy.

Figure 1A:
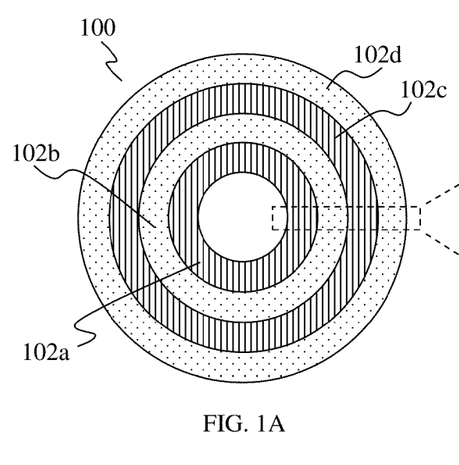
FIG. 1A shows a schematic top view of a portion of a servo layer, according to various embodiments.
Figure 1B:
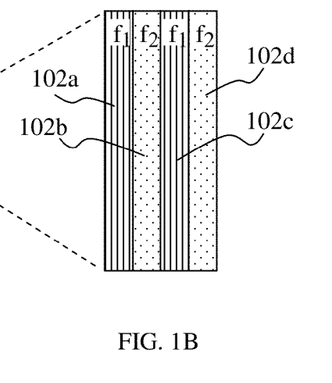
FIG. 1B shows a schematic top view of a section of the servo layer of the embodiment of FIG. 1A.

The dedicated servo layer may have a continuous track structure having a plurality of servo tracks in a concentric arrangement. Each servo track may be assigned an identical frequency signal. In another example, adjacent servo tracks may be alternately assigned different frequency signals, having respective frequencies $f_1$ and $f_2$, as illustrated in FIGS. 1A and 1B for a portion of the servo layer 100 towards its inner diameter, showing four servo tracks 102a, 102b, 102c, 102d. In this configuration, the head of the data storage device may be positioned in between two adjacent tracks (e.g. 102a and 102b; 102b and 102c), for example at the boundary of the two adjacent tracks, and may be able to obtain a readback servo signal having frequencies $f_1$ and $f_2$.

Figure 1C:
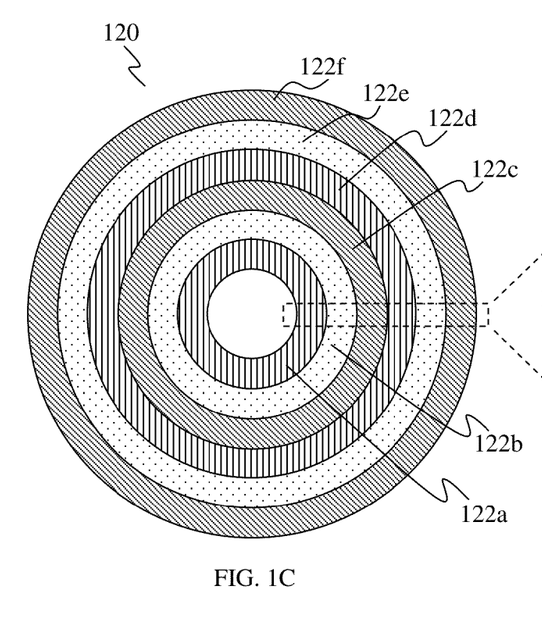
FIG. 1C shows a schematic top view of a portion of a servo layer, according to various embodiments.
Figure 1D:
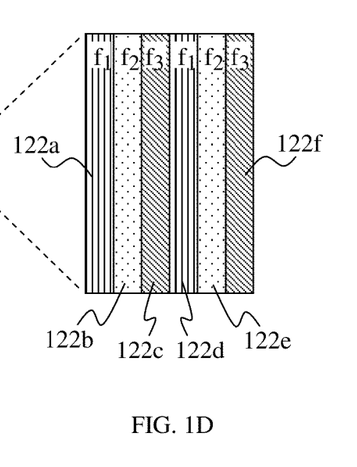
FIG. 1D shows a schematic top view of a section of the servo layer of the embodiment of FIG. 1C.

In a further example, adjacent servo tracks may be alternately assigned different frequency signals, having respective frequencies $f_1$, $f_2$ and $f_3$, as illustrated in FIGS. 1C and 1D for a portion of the servo layer 120 towards its inner diameter, showing six servo tracks 122a, 122b, 122c, 122d, 122e, 122f. In an embodiment, the head may be positioned in between two adjacent tracks (e.g. 122a and 122b; 122c and 122d), for example at the boundary of the two adjacent tracks, and may be able to obtain a readback servo signal having two different frequencies (e.g. $f_1$ and $f_2$; $f_3$ and $f_1$). In another embodiment, the head may detect up to three adjacent tracks (e.g. 122a, 122b and 122c; 122c, 122d and 122e) of signals from the servo layer. The head may be centered over one track, where signals from the adjacent tracks on either side may also be received by the head to obtain a readback servo signal having three different frequencies (e.g. $f_1$, $f_2$ and $f_3$), while signals from tracks further removed may not be received by the head.

Therefore, in various embodiments of a dedicated servo system, each servo track has a single frequency. The position error signal (PES) may be produced from the frequency based servo signal, including dual/triple frequency based signals. Using the dual frequency based servo signal as an example, during track following, the center of the head may be positioned at the middle of two adjacent servo tracks, whereby the head picks up a readback servo signal having two frequencies from the two adjacent servo tracks at the same time. In various embodiments, apart from providing the PES, the frequency based servo signal may also be further processed to generate an additional synchronization signal for write and read synchronization for the data storage device (e.g. HDD), for example for writing 2D channel code in sync for adjacent data tracks in the application of TDMR and/or as timing jitter recovery.

In other words, in various embodiments, a synchronization signal for the write and read operations, e.g. in a HDD, may be generated from signals from a dedicated magnetic layer (servo layer) which is arranged underneath the magnetic data layer. The signals (servo signals or information) are pre-written in the dedicated servo layer. A servo signal may have a unique synchronized single frequency associated with the track(s) throughout the servo layer. The servo signal may alternatively have different frequencies associated with multiple repeated servo tracks having alternate associated frequencies throughout the whole dedicated servo layer. In various embodiments, the synchronization signal may be de-convoluted or extracted from the single frequency servo signal or the multiple-frequency servo signal from multiple single frequency tracks of the dedicated servo layer. In various embodiments, the servo signal may be a continuous servo signal.

In various embodiments, the de-convolution method may include the use of a frequency mixer or a frequency mixing circuit for multiplication of the frequency-based servo signal, which may have a single frequency or more, with a generated local oscillator (LO) signal having an LO frequency, $f_{LO}$. A filter circuit, for example a bandpass filter or a low pass filter, may be applied to the frequency mixed signal generated by the frequency mixer so as to generate a synchronization signal having a single frequency, for write and/or read operations for a data storage device.

The LO frequency may be of any frequency, or may be chosen based on the frequency or frequencies of the servo signal and/or may or may not be synchronized to an index signal, e.g. a spindle index signal.

In embodiments based on a dual frequency servo signal having frequencies $f_1$ and $f_2$, $f_{LO}$ may be set as $(f_1+f_2)/2$. When the servo signal and the LO signal are frequency mixed, the frequencies are shifted relative to each other and frequency components symmetrical about a zero frequency reference are generated. After band pass filtering or low pass filtering about a frequency corresponding to that of the symmetrical frequency components, the output synchronization signal has a single frequency and a magnitude of the sum of magnitudes of the symmetrical frequency components.

In order that the invention may be readily understood and put into practical effect, particular embodiments will now be described by way of examples and not limitations, and with reference to the figures.

Figure 2A:
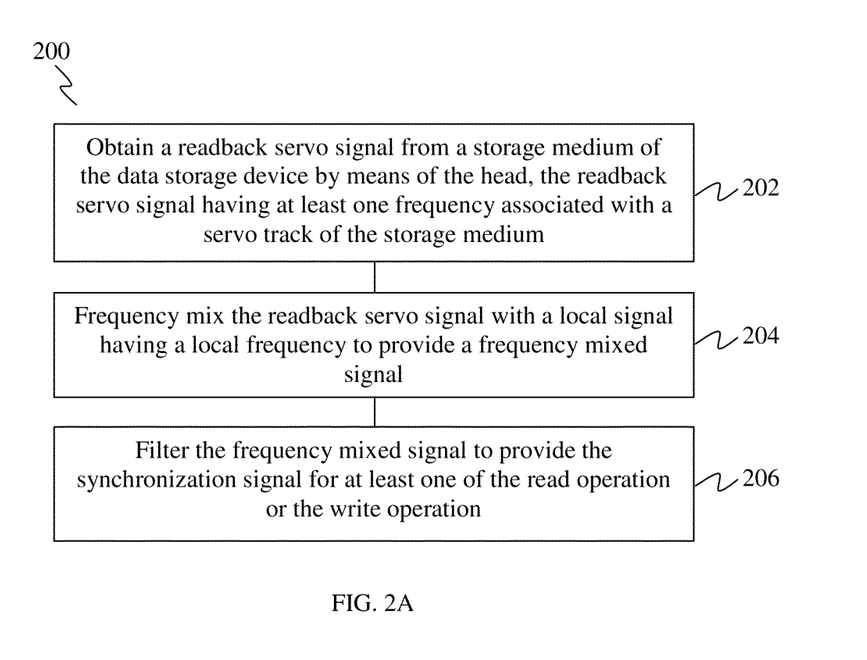
FIG. 2A shows a flow chart illustrating a method for providing a synchronization signal for at least one of a read operation or a write operation carried out by means of a head in a data storage device, according to various embodiments.

FIG. 2A shows a flow chart 200 illustrating a method providing a synchronization signal for at least one of a read operation or a write operation carried out by means of a head in a data storage device, according to various embodiments.

At 202, a readback servo signal is obtained from a storage medium of the data storage device by means of the head, the readback servo signal having at least one frequency (e.g. $f_1$) associated with a servo track of the storage medium.

At 204, the readback servo signal is frequency mixed with a local signal having a local frequency (e.g. $f_{LO}$) to provide a frequency mixed signal.

At 206, the frequency mixed signal is filtered to provide the synchronization signal for at least one of the read operation or the write operation. The synchronization signal may be used for timing jitter recovery during the read operation, and/or adjacent-track synchronization writing during the write operation, e.g. providing 2-dimensional channel code writing for implementation in a Two Dimensional Magnetic Recording (TDMR) technology.

In various embodiments, at 206, the frequency mixed signal may be bandpass filtered for passing a component of the frequency mixed signal having a down-converted frequency to provide the synchronization signal. At the same time, a component of the frequency mixed signal having an up-converted frequency is removed as a result of the bandpass filtering.

In various embodiments, the readback servo signal may have a first frequency (e.g. $f_1$) associated with a first servo track and a second frequency (e.g. $f_2$) associated with a second servo track adjacent to the first servo track. In various embodiments, the local frequency may be centred between the first frequency and the second frequency, i.e. $f_{LO}=(f_1+f_2)/2$.

In various embodiments based on the readback servo signal having the first frequency and the second frequency, at 206, the frequency mixed signal may be bandpass filtered for passing components of the frequency mixed signal having symmetrical down-converted frequencies about a zero frequency to provide the synchronization signal, wherein the synchronization signal has an amplitude of a sum of magnitudes of the components. At the same time, components of the frequency mixed signal having up-converted frequencies are removed as a result of the bandpass filtering. As a result of filtering the frequency mixed signal, a single synchronization signal with a single frequency may be produced.

In various embodiments, the readback servo signal may have a first frequency (e.g. $f_1$) associated with a first servo track, a second frequency (e.g. $f_2$) associated with a second servo track, and a third frequency (e.g. $f_3$) associated with a third servo track, where the first servo track, the second servo track, and the third servo track are adjacent servo tracks of the storage medium.

In various embodiments, the local frequency may be synchronized to a spindle index signal of the data storage device.

In various embodiments, the method may further include rectifying the synchronization signal. For example, the synchronization may have a sinusoidal waveform, and the "negative" portions or halves of the synchronization signal may be converted into "positive" portions or halves through the rectification process.

In various embodiments, a phase locked signal may be provided or generated based on the synchronization signal, where the phase locked signal is adapted for synchronizing the read operation and/or the write operation.

Figure 2B:
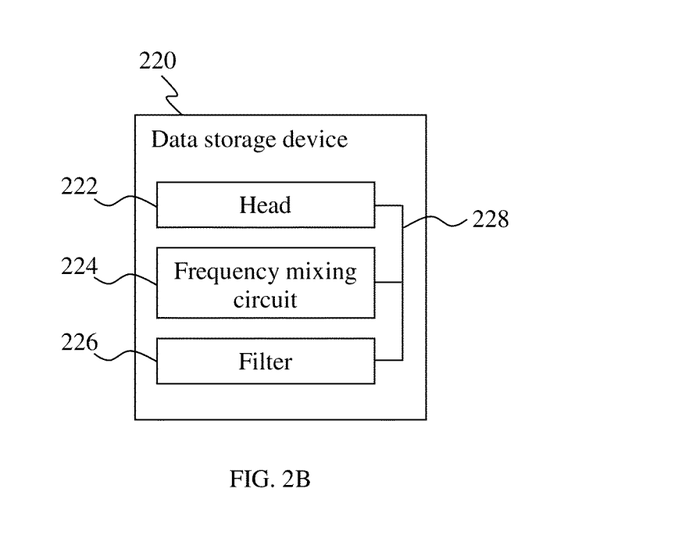
FIG. 2B shows a schematic block diagram of a data storage device, according to various embodiments.

FIG. 2B shows a schematic block diagram of a data storage device 220, according to various embodiments. The data storage device 220 includes a head 222 configured to obtain a readback servo signal from a storage medium of the data storage device 220, the readback servo signal having at least one frequency associated with a servo track of the storage medium, a frequency mixing circuit 224 configured to mix the readback servo signal with a local signal having a local frequency to provide a frequency mixed signal, and a filter (or a filter circuit) 226 configured to filter the frequency mixed signal to provide a synchronization signal for at least one of a read operation or a write operation carried out by means of the head. In FIG. 2B, the line represented as 228 is illustrated to show the relationship between the head 222, the frequency mixing circuit 224 and the filter 226, which may include electrical coupling and/or mechanical coupling.

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a 'circuit' in accordance with an alternative embodiment.

In the context of various embodiments, the data storage device 220 may include a memory which is for example used in the processing carried out by the data storage device 220. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, the data storage device 220 further includes a local oscillator (LO) configured to provide or generate the local signal.

In various embodiments, the filter 226 may be a bandpass filter (BPF) configured to bandpass filter the frequency mixed signal for passing a component of the frequency mixed signal having a down-converted frequency to provide the synchronization signal. The BPF also removes a component of the frequency mixed signal having an up-converted frequency.

In various embodiments, the readback servo signal may have a first frequency associated with a first servo track and a second frequency associated with a second servo track adjacent to the first servo track. In various embodiments, the local frequency may be centred between the first frequency and the second frequency.

In various embodiments based on the readback servo signal having the first frequency and the second frequency, the filter 226 may be a bandpass filter configured to bandpass filter the frequency mixed signal for passing components of the frequency mixed signal having symmetrical down-converted frequencies about a zero frequency to provide the synchronization signal, wherein the synchronization signal has an amplitude of a sum of magnitudes of the components. The BPF also removes components of the frequency mixed signal having up-converted frequencies. As a result of filtering the frequency mixed signal, a single synchronization signal with a single frequency may be produced.

In various embodiments, the readback servo signal may have a first frequency associated with a first servo track, a second frequency associated with a second servo track, and a third frequency associated with a third servo track, where the first servo track, the second servo track, and the third servo track are adjacent servo tracks of the storage medium.

In various embodiments, the local frequency may be synchronized to a spindle index signal of the data storage device 200.

In various embodiments, the data storage device 200 may further include a rectifier configured to rectify the synchronization signal.

In various embodiments, the data storage device 200 may further include a phase lock loop (PLL) configured to provide a phase locked signal based on the synchronization signal, where the phase locked signal is adapted for synchronizing the read operation and/or the write operation.

In the context of various embodiments, the synchronization signal may be configured for synchronizing a read operation carried out by means of the head, and/or a write operation carried out by means of the head. For example, the head may be controlled by the synchronization signal to perform a synchronized writing operation for adjacent tracks, while reading.

In the context of various embodiments, the readback servo signal may be a continuous servo signal. In other words, the servo layer may provide a continuous servo signal, from which a synchronization signal for read and/or write operations may be obtained or generated.

In the context of various embodiments, the readback servo signal is obtained or extracted from a dedicated servo layer of a storage medium, which is separate from the data recording layer of the storage medium. In one embodiment, the servo layer is arranged below the data recording layer, with the data recording layer being proximal to the head and the servo layer being distal to the head. The servo layer provides servo information or positioning signals for servo control and a synchronization signal for read/write operations.

In the context of various embodiments, the servo layer may include a plurality of concentric tracks for holding the servo information. Each servo track may be assigned or associated with a single frequency signal. Adjacent servo tracks may be assigned different frequencies. Repeated servo tracks may be assigned alternate frequencies. In the context of various embodiments, adjacent servo tracks mean tracks that are arranged side-by-side. In various embodiments, two adjacent servo tracks share a common boundary.

In the context of various embodiments, the data storage device (e.g. 220) may be a hard disk drive (HDD).

In the context of various embodiments, the term "head" may include a magnetic head. In addition, the "head" may refer to the read/write head for reading/writing information or data from/to a storage medium. The head includes a reader and a writer. The head is positioned over a storage medium and the reader may read signal or information from the storage medium and the writer may write information to the storage medium.

In the context of various embodiments, the term "up-converted frequency" means a frequency which is the addition or sum of the input frequencies provided to a frequency mixing circuit (e.g. 224).

In the context of various embodiments, the term "down-converted frequency" means a frequency which is the difference between the input frequencies provided to a frequency mixing circuit (e.g. 224).

In the context of various embodiments, a data storage device includes a spindle which refers to a mechanical part, which may be rotatable, and that may serve as an axis for a rotatable part held by the spindle. As a non-limiting example, in a hard disk drive, the spindle holds a circular disk (or platter) as storage medium that holds data. A spindle index signal is generated each time the spindle makes a rotation, thereby providing an indication that the spindle has made one rotation (360-degree rotation) in a period between the generation of one spindle index signal and the generation of the next spindle index signal.

In the context of various embodiments, apart from the spindle index signal, the local frequency may be synchronized to a servo index signal or any other index signal associated with the data storage device 200.

In the context of various embodiments, it should be appreciated that the filter (e.g. 226) may alternatively be a low pass filter (LPF) for passing the component(s) of the frequency mixed signal having a down-converted frequency.

Figure 3A:
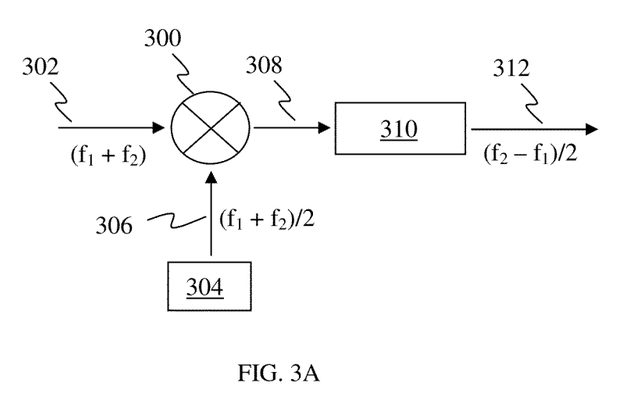
FIG. 3A shows a schematic block diagram illustrating an implementation of the frequency mixing method, according to various embodiments.

Various embodiments provide a frequency mixing de-convolution method for generating a synchronization signal from the dedicated readback servo signal. FIG. 3A shows a schematic block diagram illustrating an implementation of the frequency mixing method, according to various embodiments, for generating a synchronization signal from a servo signal from a servo layer of a storage medium of a data storage device.

The frequency mixing method will now be described by the following non-limiting example based on a dual frequency based servo signal. A frequency mixer 300 is provided, which receives two input signals. One of the input signals is the readback servo signal, represented by the arrow 302, obtained from the servo layer. The servo signal 302 includes two frequencies, $f_1$ and $f_2$, associated with two adjacent servo tracks.

A local oscillator (LO) 304 is also provided to provide an LO signal, represented by the arrow 306, having a frequency, $f_{LO}$ as the other input to the frequency mixer 300. In one embodiment, $f_{LO}$ may be chosen to be the centre frequency between the two frequencies, $f_1$ and $f_2$, of the servo signal 302, i.e. $(f_{LO}=(f_1+f_2)/2)$.

The frequency mixer 300 is configured to mix the servo signal 302 and the LO signal 306, where the mixing process multiplies the two input signals, i.e. the servo signal 302 and the LO signal 306. A multiplication of two signals having different frequencies, e.g. in the form of cosine waveforms, may result in signals based on the following trigonometry identity:

$$\cos(A)\cos(B) = \frac{1}{2}[\cos(A+B) + \cos(A-B)]. \quad \text{(Equation 1)}$$

Based on Equation 1, the frequency mixing process results in an output signal (i.e. frequency mixed signal), represented by the arrow 308, having 2 frequency components, respectively of (A+B) (up-conversion) and (A−B) (down-conversion). In other words, the frequency mixed signal 308 has a component having an up-converted frequency (A+B) and another component having a down-converted frequency (A−B).

The frequency mixed signal 308 may be applied to a filter 310, for example a band pass filter (BPF) or a low pass filter (LPF), where the filter 310 has a passband that encompasses the frequency (A−B) so as to pass the component having the down-converted frequency (A−B), and remove the component having the up-converted frequency (A+B).

Based on Equation 1 and the servo signal 302 having the frequencies, $f_1$ and $f_2$, and the LO signal 306 having the frequency $(f_1+f_2)/2$, the frequency mixed signal 308 may be determined as below. For ease of understanding and clarity, only the frequency parameter is shown.

$$\text{Frequency mixed signal} = (\cos(f_1) + \cos(f_2)) \times \left(\cos\left(\frac{f_1+f_2}{2}\right)\right), \text{(Equation 2)}$$

$$= \frac{1}{2}\left[\cos\left(\frac{1}{2}(3f_1+f_2)\right) + \right. \quad \text{(Equation 3)}$$

$$\cos\left(\frac{1}{2}(f_1+3f_2)\right) +$$

$$\left. \cos\left(\frac{1}{2}(f_2-f_1)\right) + \cos\left(-\frac{1}{2}(f_2-f_1)\right)\right].$$

Therefore, the filter 310 may have a passband that passes the down-converted frequency $(f_2-f_1)/2$, while removing components having the up-converted frequencies $(3f_1+f_2)/2$ and $(f_1+3f_2)/2$. The filter 310 therefore produces an output signal, represented by the arrow 312, having the frequency $(f_2-f_1)/2$. The single output signal 312 may be used directly as a synchronisation signal, or may be applied to a phase lock loop (PLL) to generate a phase locked synchronisation signal, as will be described later.

Figure 3B:
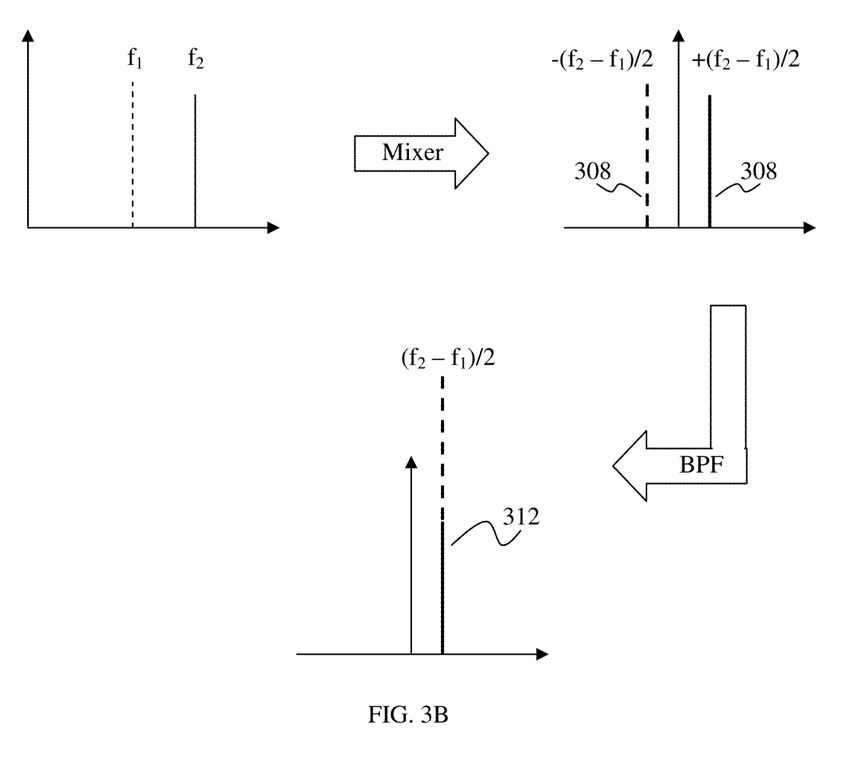
FIG. 3B shows an illustration of the generation of a synchronisation signal using the frequency mixing method of various embodiments.

FIG. 3B shows an illustration of the generation of a synchronisation signal using the frequency mixing method of various embodiments, based on a dual frequency servo signal with frequencies, $f_1$ and $f_2$ and an LO signal with frequency $f_{LO}=(f_1+f_2)/2$. After frequency mixing, components having down-converted frequencies and components having up-converted frequencies are produced as a result of the mixing process. For illustration purposes, only the two components having the down-converted frequencies, $(f_2-f_1)/2$ and $-(f_2-f_1)/2$, being symmetrical about a zero frequency, are shown in FIG. 3B. After being applied to a BPF, and based on the trigonometry identity $\cos(-(A-B))=\cos(A-B)$, the BPF outputs a signal having a single frequency $(f_2-f_1)/2$, and an amplitude equal to the sum of magnitudes of the respective components.

Figure 3C:
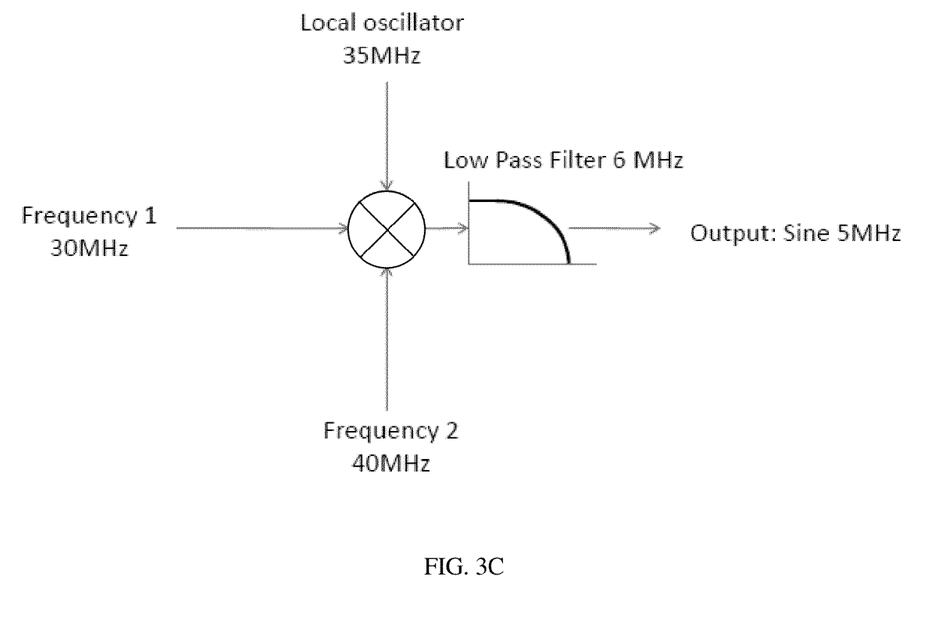
FIG. 3C shows a schematic diagram illustrating an example of the implementation of the frequency mixing method.

As a non-limiting example, $f_1$ may be 30 MHz, $f_2$ may be 40 MHz and $f_{LO}$ may be 35 MHz, as illustrated in FIG. 3C. The filter 310 may be a low pass filter with a passband up to 6 MHz, i.e. removing any signal having a frequency beyond 6 MHz, thereby providing an output signal (synchronisation signal), e.g. in the form of a sinusoidal waveform, having a frequency of 5 MHz.

Figure 4A:
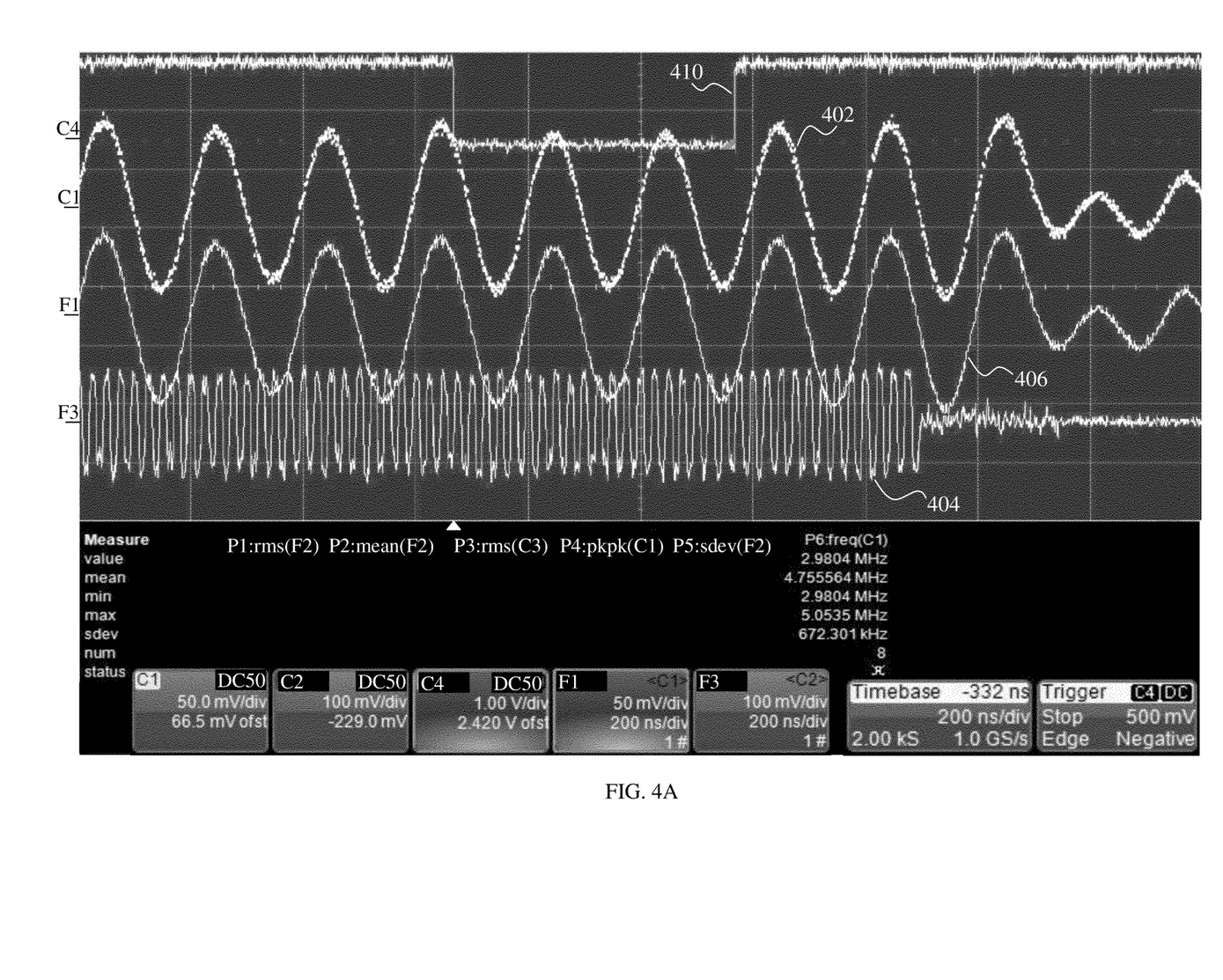
FIG. 4A shows a single instance screen shot of oscilloscope signals illustrating an example of a synchronisation signal generated as a result of frequency mixing between a single frequency servo signal and a non-synchronised local oscillator (LO) signal.

FIG. 4A shows a single instance screen shot of oscilloscope signals, triggered at the spindle index signal, illustrating an example of an output signal (synchronisation signal) 402 generated as a result of frequency mixing between a single frequency servo signal 404 and a non-synchronised LO signal (not shown). FIG. 4A also shows a signal 406 which illustrates an instance average over the output signal 402, which is substantially the same as the output signal 402. While not clearly shown, there is an additional signal which overlaps the servo signal 404, the additional signal being an instance average over the servo signal 404, and substantially the same as the servo signal 404. FIG. 4A also shows a spindle index signal 410.

Figure 4B:
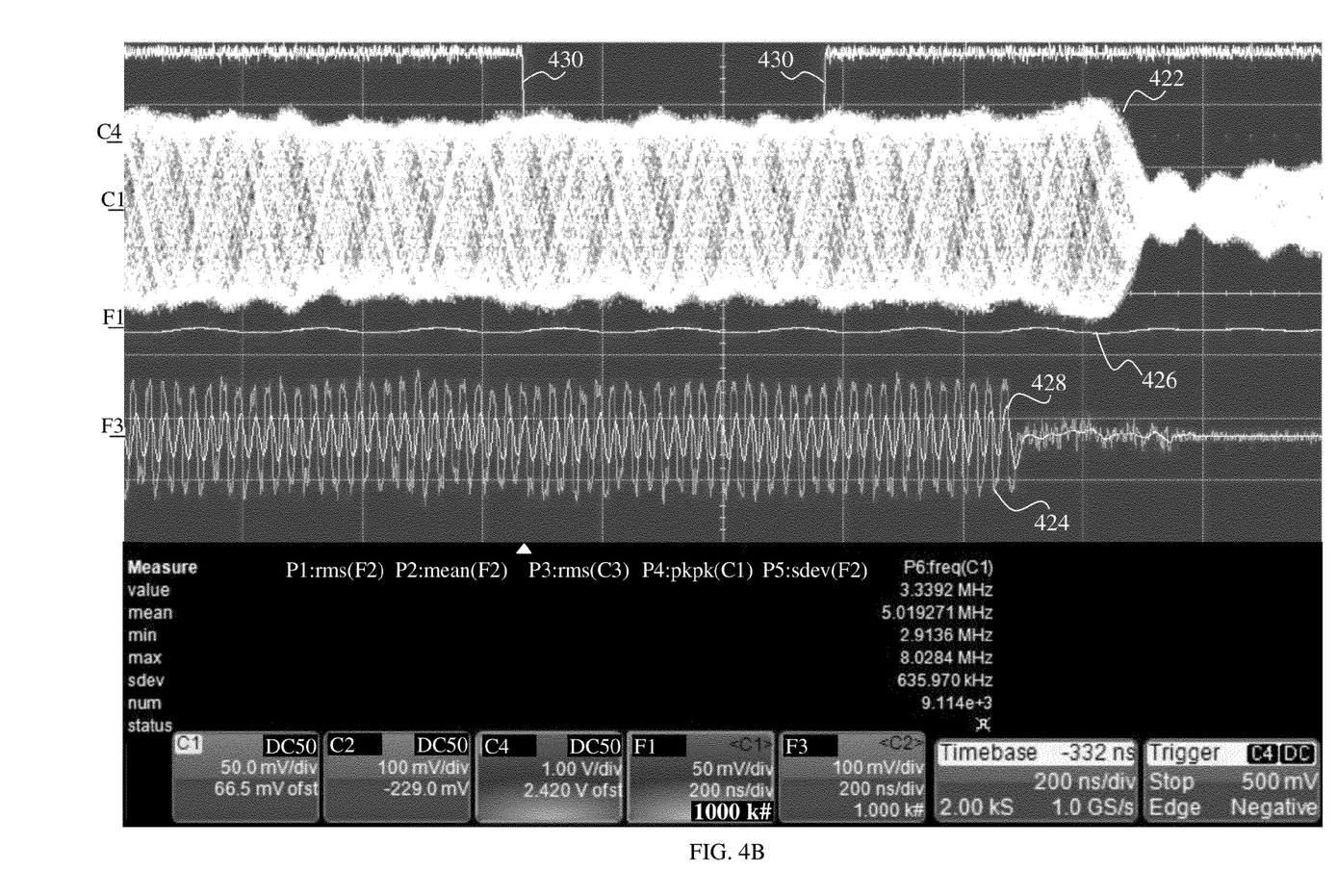
FIG. 4B shows a screen shot of persistent mode of oscilloscope signals illustrating a synchronisation signal generated as a result of frequency mixing between a single frequency servo signal and a non-synchronised local oscillator (LO) signal.

FIG. 4B shows a screen shot of persistent mode of oscilloscope signals, triggered at the spindle index signal, illustrating an output signal (synchronisation signal) 422 generated as a result of frequency mixing between a single frequency servo signal 424, and a non-synchronised LO signal (not shown). FIG. 4B also shows a signal 426 which illustrates a multiple average over the output signal 422, a signal 428 which illustrates a multiple average over the servo signal 424, and a spindle index signal 430. The phase of the output signal 422 is not synchronised with the servo signal location as the frequency of the LO signal is not synchronised with the spindle index signal 430 (i.e. non-synchronized LO). The signal 428 illustrates that there is a spindle timing jitter with respect to the servo signal 424, which may adversely affect the synchronisation signal 422 where the LO frequency is not synchronized to the spindle index signal 430.

A non-synchronized LO frequency may result in random phase shifting of the generated synchronisation signal 422 corresponding to different readback servo signals or readback revolutions. In embodiments based on a single frequency servo signal, the output signal may be synchronised to the servo signal location by using an LO signal having a frequency synchronised to the spindle index signal 430 (i.e. synchronized LO).

Figure 5:
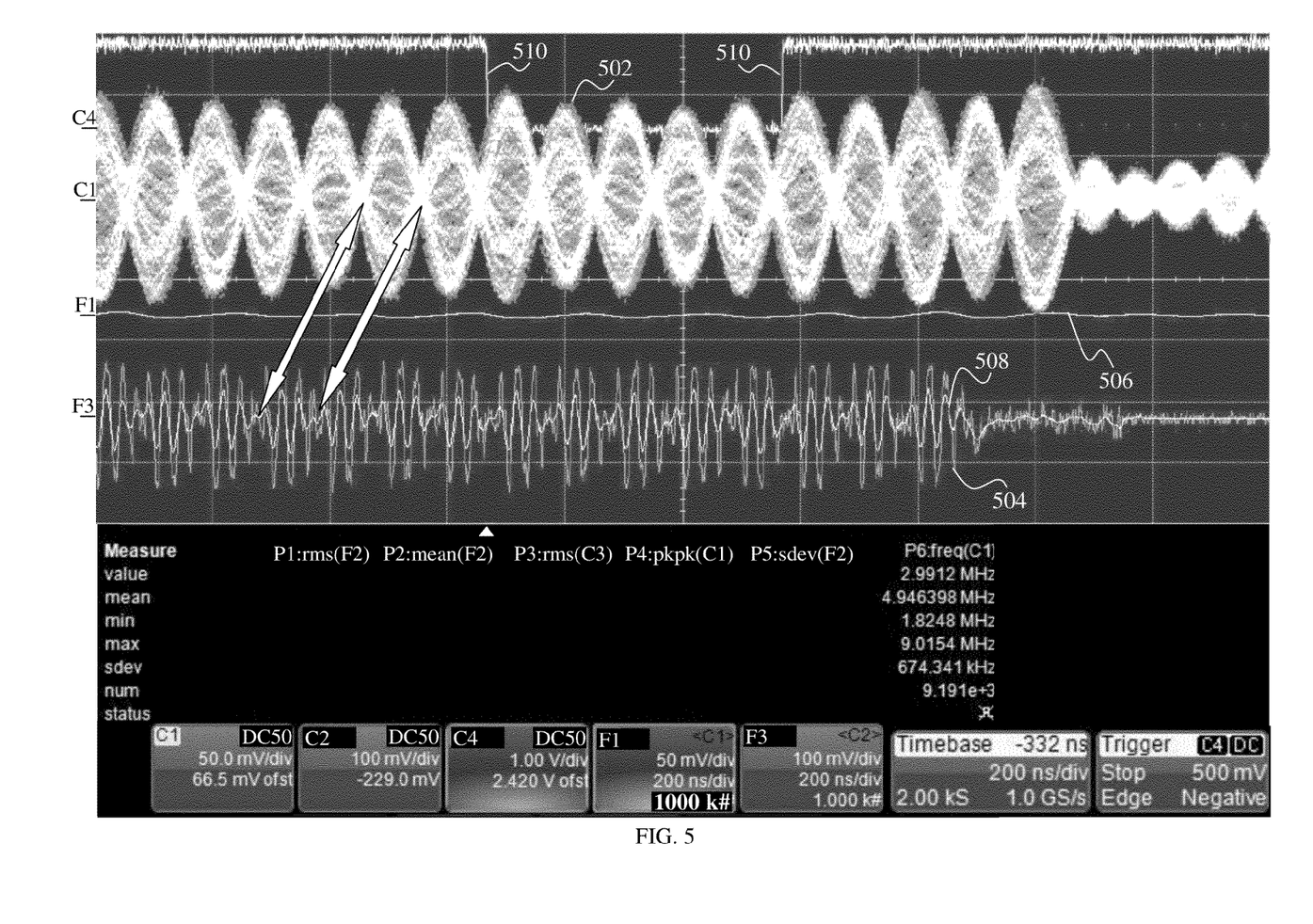
FIG. 5 shows a screen shot of oscilloscope signals illustrating an example of a synchronisation signal generated as a result of frequency mixing between a dual frequency servo signal and a non-synchronised local oscillator (LO) signal.

FIG. 5 shows a screen shot of oscilloscope signals, triggered at the spindle index signal, illustrating an example of an output signal (synchronisation signal) 502 generated as a result of frequency mixing between a dual frequency servo signal 504 and a non-synchronised local oscillator (LO) signal (not shown). FIG. 5 also shows a signal 506 which illustrates a multiple average over the output signal 502, a signal 508 which illustrates a multiple average over the servo signal 504, and a spindle index signal 510. As shown in FIG. 5, the output signal 502 shows consistent zero crossing points that correspond or are synchronised with the corresponding servo signal locations, as indicated by the block arrows for two zero crossing points, although the signals generated may be out of phase, for example 180° out of phase. Therefore, despite employing a non-synchronized LO frequency, $f_{LO}$, the output signal generated from the readback dual frequency servo signal may still serve as a useful synchronization signal and may be used for synchronisation of the write and/or read operations in a HDD.

Figure 6:
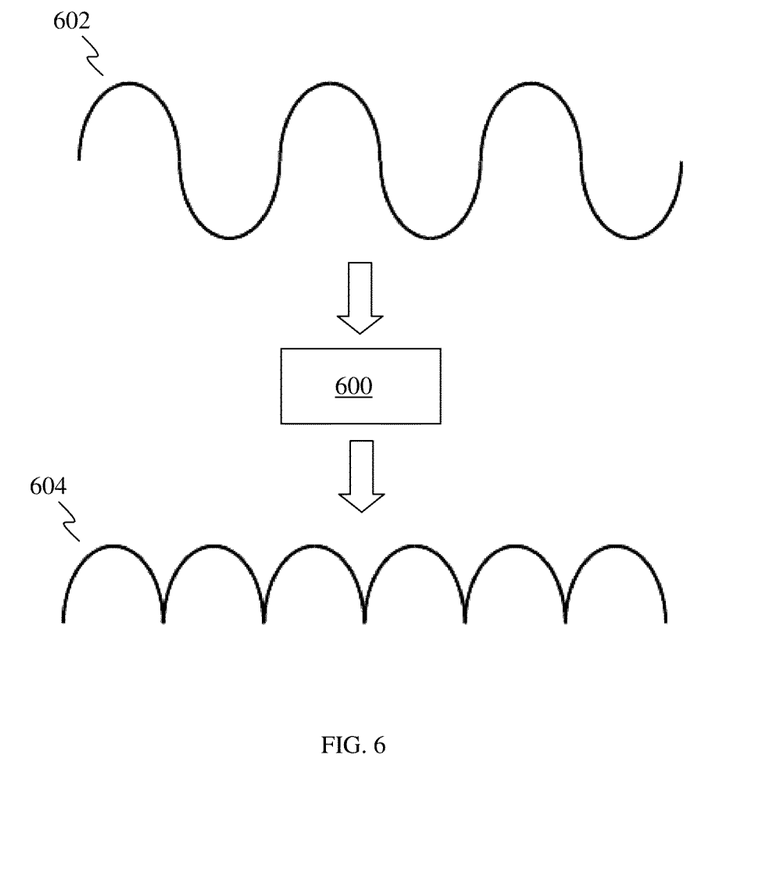
FIG. 6 shows an illustration of the rectification of a signal.

In various embodiments, and as shown in FIG. 6, the generated output signal 602 having a sinusoidal waveform with alternating positive and negative signal portions may be applied to a rectifier 600 so as to invert the negative signal portions to produce a signal 604 having a series of positive signal portions.

In further embodiments, a synchronised local oscillator (LO) signal, where the LO frequency is synchronised with the spindle index signal 510, may be employed for frequency mixing with dual frequency servo signals, in which the generated output signal may be directly employed as a synchronization signal for HDD write and/or read operations.

In various embodiments, the synchronisation signal generated from the servo signal, based on the frequency mixing approach, may be used as a clock signal for synchronized writing and/or reading in a HDD. Additionally, a phase lock loop (PLL) may be employed so as to generate a signal that is phase locked or matched to that of the generated clock signal, as the PLL may at least substantially precisely lock to the phase of a single frequency signal at least substantially instantaneously. Furthermore, as frequency is related to phase, the output frequency from the PLL may be matched to the input frequency applied to the PLL and therefore a phase-locked loop may be employed to track the input frequency. Using a PLL may therefore provide an improved position signal and enhance synchronisation of the write and/or read operations in HDD applications.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for providing a synchronization signal for at least one of a read operation or a write operation carried out by means of a head in a data storage device, the method comprising:
   obtaining a readback servo signal from a storage medium of the data storage device by means of the head, the readback servo signal having at least one frequency associated with a servo track of the storage medium;
   frequency mixing the readback servo signal with a local signal having a local frequency to provide a frequency mixed signal; and
   filtering the frequency mixed signal to provide the synchronization signal for at least one of the read operation or the write operation,
   wherein filtering the frequency mixed signal comprises bandpass filtering or low pass filtering the frequency mixed signal for passing a component of the frequency mixed signal having a down-converted frequency to provide the synchronization signal.

2. The method of claim 1, further comprising synchronizing the local frequency to a spindle index signal of the data storage device.

3. The method of claim 1, further comprising rectifying the synchronization signal.

4. The method of claim 1, further comprising providing a phase locked signal based on the synchronization signal, the phase locked signal adapted for synchronizing at least one of the read operation or the write operation.

5. The method of claim 1, wherein the readback servo signal is a continuous servo signal.

6. The method of claim 1, wherein the readback servo signal has a first frequency associated with a first servo track, a second frequency associated with a second servo track, and a third frequency associated with a third servo track, wherein the first servo track, the second servo track, and the third servo track are adjacent servo tracks of the storage medium.

7. A method for providing a synchronization signal for at least one of a read operation or a write operation carried out by means of a head in a data storage device, the method comprising:
   obtaining a readback servo signal from a storage medium of the data storage device by means of the head, the readback servo signal having at least one frequency associated with a servo track of the storage medium;
   frequency mixing the readback servo signal with a local signal having a local frequency to provide a frequency mixed signal; and
   filtering the frequency mixed signal to provide the synchronization signal for at least one of the read operation or the write operation,
   wherein the readback servo signal has a first frequency associated with a first servo track and a second frequency associated with a second servo track adjacent to the first servo track,
   wherein the local frequency is centered between the first frequency and the second frequency, and
   wherein filtering the frequency mixed signal comprises bandpass filtering or low pass filtering the frequency mixed signal for passing components of the frequency mixed signal having symmetrical down-converted frequencies about a zero frequency to provide the synchronization signal, wherein the synchronization signal has an amplitude of a sum of magnitudes of the components.

8. A data storage device, comprising:
a head configured to obtain a readback servo signal from a storage medium of the data storage device, the readback servo signal having at least one frequency associated with a servo track of the storage medium;
a frequency mixing circuit configured to mix the readback servo signal with a local signal having a local frequency to provide a frequency mixed signal; and
a filter configured to filter the frequency mixed signal to provide a synchronization signal for at least one of a read operation or a write operation carried out by means of the head,
wherein the filter is a bandpass filter or a low pass filter configured to filter the frequency mixed signal for passing a component of the frequency mixed signal having a down-converted frequency to provide the synchronization signal.

9. The data storage device of claim 8, further comprising a local oscillator configured to provide the local signal.

10. The data storage device of claim 8, wherein the local frequency is synchronized to a spindle index signal of the data storage device.

11. The data storage device of claim 8, further comprising a rectifier configured to rectify the synchronization signal.

12. The data storage device of claim 8, further comprising a phase lock loop configured to provide a phase locked signal based on the synchronization signal, the phase locked signal adapted for synchronizing at least one of the read operation or the write operation.

13. The data storage device of claim 8, wherein the readback servo signal has a first frequency associated with a first servo track, a second frequency associated with a second servo track, and a third frequency associated with a third servo track, wherein the first servo track, the second servo track, and the third servo track are adjacent servo tracks of the storage medium.

14. A data storage device, comprising:
a head configured to obtain a readback servo signal from a storage medium of the data storage device, the readback servo signal having at least one frequency associated with a servo track of the storage medium;
a frequency mixing circuit configured to mix the readback servo signal with a local signal having a local frequency to provide a frequency mixed signal; and
a filter configured to filter the frequency mixed signal to provide a synchronization signal for at least one of a read operation or a write operation carried out by means of the head,
wherein the readback servo signal has a first frequency associated with a first servo track and a second frequency associated with a second servo track adjacent to the first servo track,
wherein the local frequency is centered between the first frequency and the second frequency, and
wherein the filter is a bandpass filter or a low pass filter configured to filter the frequency mixed signal for passing components of the frequency mixed signal having symmetrical down-converted frequencies about a zero frequency to provide the synchronization signal, wherein the synchronization signal has an amplitude of a sum of magnitudes of the components.

15. A method for providing a synchronization signal for at least one of a read operation or a write operation carried out by means of a head in a data storage device, the method comprising:
obtaining a readback servo signal from a servo track of a storage medium of the data storage device by means of the head, the readback servo signal having at least one frequency associated with the servo track of the storage medium;
frequency mixing the readback servo signal obtained from the servo track with a local signal having a local frequency to provide a frequency mixed signal; and
filtering the frequency mixed signal, as provided by frequency mixing the readback servo signal obtained from the servo track, to provide the synchronization signal for at least one of the read operation or the write operation.

* * * * *